United States Patent
Haas

[11] 3,888,506
[45] June 10, 1975

[54] OCCUPANT KNEE RESTRAINT
[75] Inventor: Ronald H. Haas, Okemos, Mich.
[73] Assignee: General Motors Corporation, Detroit, Mich.
[22] Filed: Oct. 10, 1973
[21] Appl. No.: 404,877

[52] U.S. Cl. ............................ 280/150 B; 180/90
[51] Int. Cl. ...................... B60r 21/04; B60r 21/10
[58] Field of Search .... 280/150 B, 150 AB; 180/90; 98/2.05, 2.06, 2.07, 2.08, 110, 40 V, 40 R

[56] References Cited
UNITED STATES PATENTS

| | | | |
|---|---|---|---|
| 2,966,952 | 1/1961 | Wilfert | 180/90 |
| 3,252,398 | 5/1966 | First | 98/40 V |
| 3,456,572 | 7/1969 | Beyer et al. | 180/90 |
| 3,498,402 | 3/1970 | Barenyi et al. | 180/90 |
| 3,641,128 | 10/1971 | Sobkow | 180/90 |
| 3,683,787 | 12/1970 | Cary | 98/40 V |
| 3,702,081 | 11/1972 | Arnston | 74/492 |
| 3,702,706 | 11/1972 | Sobkow | 280/150 AB |
| 3,774,713 | 11/1973 | Stegmaier | 280/150 B |

FOREIGN PATENTS OR APPLICATIONS
1,115,317  12/1955  France ........................ 280/150 B Primary Examiner—Kenneth H. Betts
Assistant Examiner—Jack D. Rubenstein
Attorney, Agent, or Firm—Herbert Furman

[57] ABSTRACT

An occupant knee restraint includes plastically deformable driver knee engageable portions located to each side of an energy absorbing steering column assembly and interconnected by a center portion partially surrounding the lower part of the column assembly. The center portion includes an aperture opening upwardly to the column assembly. A closure arrangement includes a housing and an adjustable vane, both of frangible plastic material. The housing is mounted in the aperture of the center portion and the vane is mounted in the housing. Upon upward displacement of the knee restraint due to driver engagement with either the knee deformable side portions or the center portion, the frangible housing and vane break to permit collapse of the column assembly without interference from the knee restraint.

3 Claims, 5 Drawing Figures

OCCUPANT KNEE RESTRAINT

This invention relates generally to occupant knee restraints and more particularly to an occupant knee restraint including a center portion which is spaced with respect to an energy absorbing steering column assembly and includes a frangible closure arrangement in such space which moves with the knee restraint upon engagement thereof by the driver's knees and breaks due to engagement with the steering column assembly to avoid any interference with energy absorbing collapse thereof.

Copending applications Ser. No. 276,084 Arntson, et al., Occupant Knee Restraint, filed July 28, 1972, and Ser. No. 406,262 Arntson, et al., filed Oct. 15, 1973, both assigned to the assignee of this invention, disclose occupant knee restraints of the type including a sheet metal backing plate covered with a thin layer of foam material and an outer decorative vinyl covering which are arranged so as to provide knee engageable side portions located to each side of the steering column assembly of the vehicle and a center portion which interconnects the side portions and is located underneath and in partially surrounding relationship to the steering column assembly. The side portions have their upper and lower edges respectively mounted to the instrument panel and fixed vehicle body structure for plastic deformation and energy absorption when engaged by the driver's knees. The center portion is connected to the rigid support structure for the column assembly by a bracket which blocks deformation of this center portion into the column assembly due to engagement therewith by the driver's knees.

In accordance with this invention, the center portion is provided with an aperture which opens upwardly to the lower part of the column assembly. This aperture is closed by a frangible closure arrangement which, in the preferred embodiment, comprises a ventilation arrangement adapted for connection to the vehicle ventilation system and including a housing and an adjustable vane. The entire ventilation assembly is made of frangible plastic material.

The knee restraint moves upwardly when either the side portions or the center portion are engaged by the driver's knees. When this occurs, the ventilation arrangement moves with the knee restraint into engagement with the column assembly and then breaks to avoid any interference between the center portion of the knee restraint and the column assembly which might affect energy absorbing collapse thereof.

The primary feature of this invention is that it provides an occupant knee restraint which includes a center portion partially surrounding the lower part of an energy absorbing steering column and including an aperture opening upwardly to such column, with this aperture being closed by a frangible closure arrangement which breaks due to engagement thereof with the column assembly upon deformation movement of the knee restraint relative to the column assembly. Another feature of this invention is that the closure arrangement is formed of frangible plastic material and includes a closure housing mounting an adjustable vane, with the housing being adapted to be connected to the vehicle ventilation system.

These and other features of the invention will be readily apparent from the following specification and drawings wherein.

Figure 1:
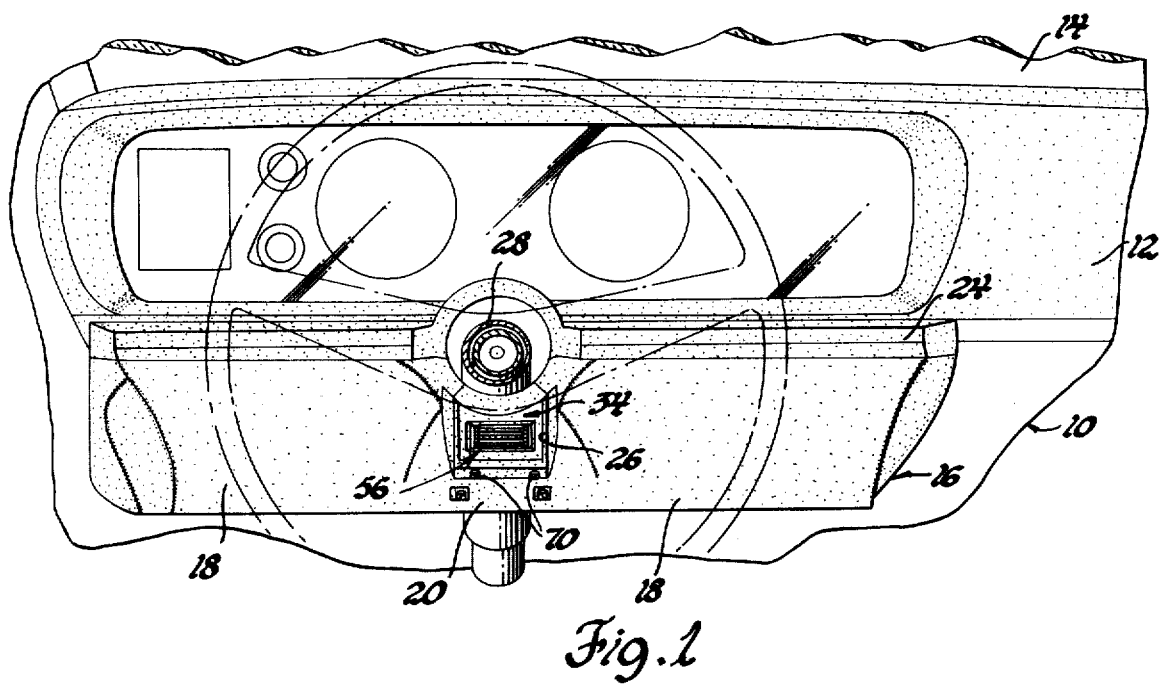
FIG. 1 is a partial view of a vehicle embodying an occupant knee restraint having a closure arrangement according to this invention.

Referring now particularly to FIG. 1 of the drawings, a vehicle 10 includes an instrument panel 12 and a windshield 14. The driver's position is provided with an occupant knee restraint 16 which generally includes a pair of driver knee deformable side portions 18 and a center portion 20. The knee restraint 16 is disclosed in detail in copending application Ser. No. 406,262 Arntson, et al., filed Oct. 15, 1973, and, therefore, only a brief description will be given herein.

Figure 5:
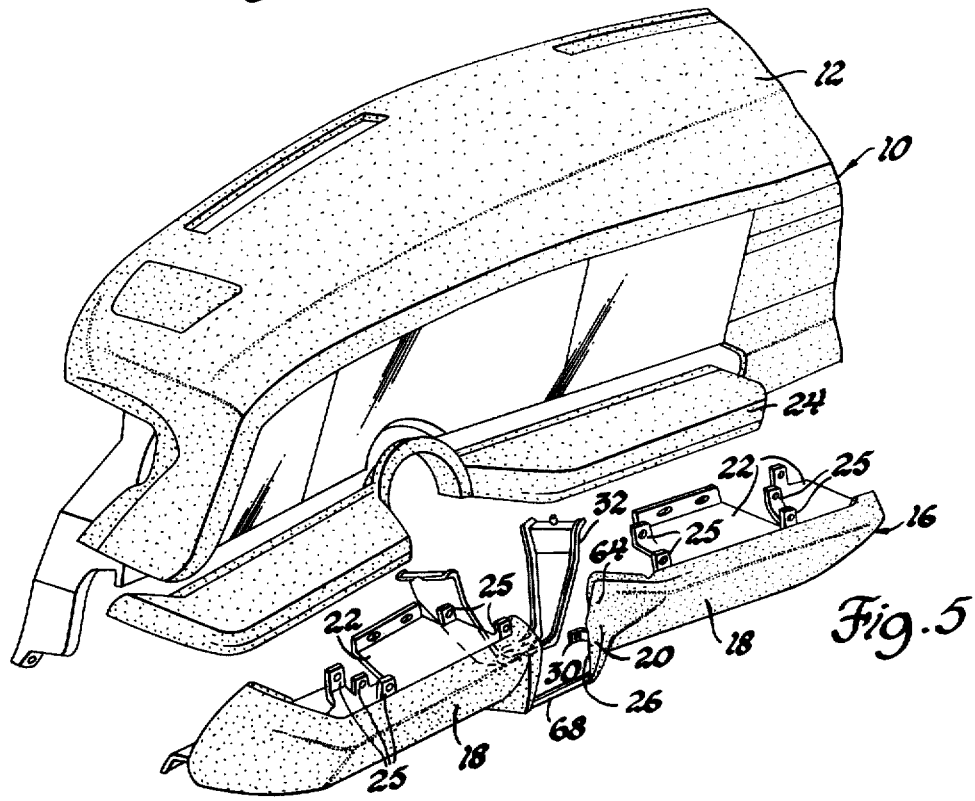
FIG. 5 is an enlarged blown-apart perspective view of a portion of FIG. 1.
Figure 6:
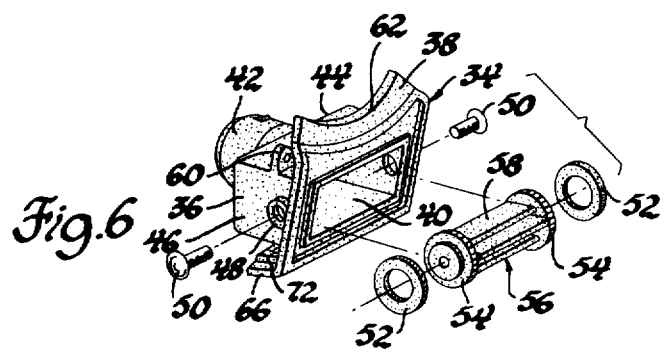
FIG. 6 is an enlarged blown-apart perspective view of a portion of FIG. 2.

As shown in FIG. 5, the knee restraint 16 has its upper edge portion secured to a lower edge portion of the instrument panel 12 by a series of flanged integral brackets 22 extending forwardly from the upper edge of the metal back plate as shown in detail in the aforenoted application. The lower edge of the knee restraint is fixedly secured to both the pillar and forward wall of the body. A cover assembly 24 covers the integral brackets 22 and is releasably secured to other flanged integral brackets 25 of the back plate to hide both brackets from view. The center portion 20 of the knee restraint is provided with a generally rectangularly shaped aperture 26 which opens upwardly to the energy absorbing steering column assembly 28 as shown in FIG. 1. The steering column assembly includes a rearward portion and a forward portion with the former being collapsible relative to the latter to absorb the kinetic energy of the upper torso of the driver. Reference may be had to Arntson U.S. Pat. No. 3,702,181, issued Nov. 7, 1972, for further details of the column assembly.

Portions of the formed sheet metal backing plate of the knee restraint 16, at the aperture 26, are formed into offset apertured attachment flanges 30 as shown in FIG. 5.

In addition to the mounting of the upper and lower edges of the knee restraint to the instrument panel and other body structure as stated before, the knee restraint is additionally secured to the fixed bracket structure which supports the column assembly 28 by a generally U-shaped rigid bracket 32, FIG. 5, having its base secured to the lower wall of the center portion 20 and its legs respectively secured to the column support bracket to each side of the impact releasable means supporting the rearward portion of the column assembly thereon. These details are likewise shown in the aforenoted Arntson application.

When the driver's knees engage the knee-engageable portions 18 between their upper and lower edges, or engage the center portion 20, the center portion of the knee restraint, rearwardly of bracket 32, can be displaced upwardly and forwardly of the vehicle with respect to the column assembly 28. The bracket 32 blocks engagement of the center portion, at and forwardly of the bracket, with the column assembly.

In accordance with this invention, a frangible closure arrangement 34 is provided for the aperture 26. This closure arrangement is mounted on the center portion of the knee restraint and movable therewith as the center portion, rearwardly of bracket 32, moves toward the column assembly. Upon engagement of the closure arrangement with the column assembly, it breaks so as to avoid any interference with collapse of the rearward portion of the column assembly with respect to the forward portion thereof.

With reference now to FIGS. 2 through 4 and 6, the closure arrangement 34 includes a generally rectangularly shaped housing 36 having a face plate 38 surrounding a rearward opening 40 thereof and a generally cylindrical extension 42 extending forwardly from the forward wall 44 thereof. The side walls 46 of the housing 36 are provided with apertured bosses 48. Pins 50 extend through these bosses and through washers 52 into engagement with the circular end walls 54 of a vane assembly 56. The vane assembly includes a number of spaced vanes 58 which are formed integral with and interconnect the end walls 54. Thus the vane assembly is mounted within the forward opening 40 of housing 36 for manual rotation to any adjusted position by manual frictional engagement with the knurled outer edge of either end plate.

The housing 36 further includes a spaced pair of laterally upwardly extending apertured ears 60 which seat against the offset flanges 30 of the center portion of the knee restraint and are conventionally secured thereto. Additionally, the face plate 38 includes an upwardly extending arcuate flange 62 which fits between upper arcuately shaped wall portions 64 of the center portion 20 and a lower laterally extending flange 66 which extends underneath the lower wall 68 of the center portion. A pair of bolts 70, FIG. 1, extend through suitable apertures in flange 66 and into apertured embossments 72 of wall 68 to thereby secure this flange to the center portion.

Figure 2:
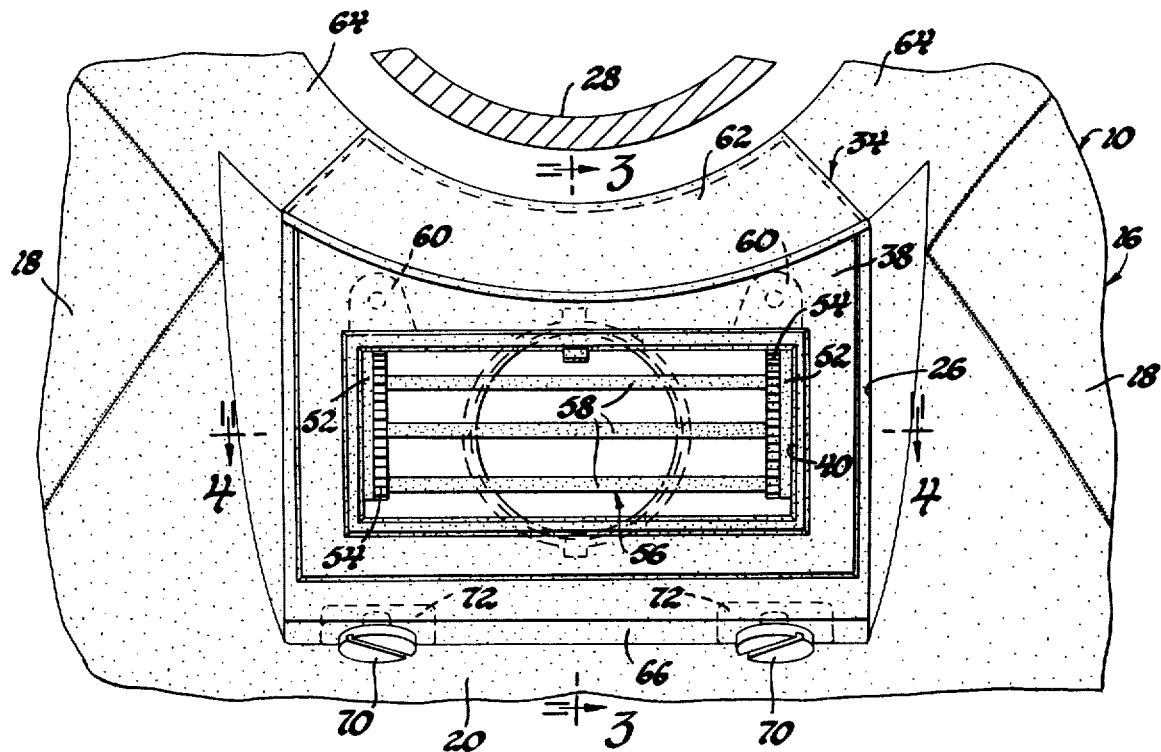
FIG. 2 is an enlarged view of a portion of FIG. 1.
Figure 3:
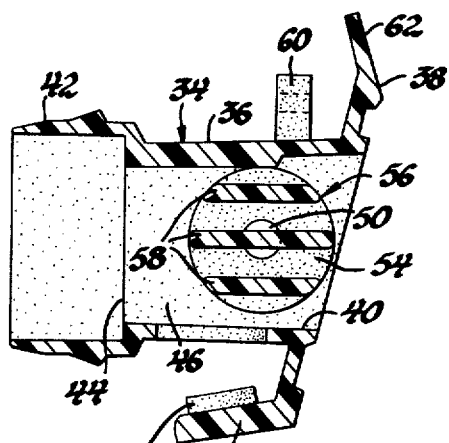
FIG. 3 is an enlarged sectional view taken generally along the plane indicated by line 3—3 of FIG. 2.
Figure 4:
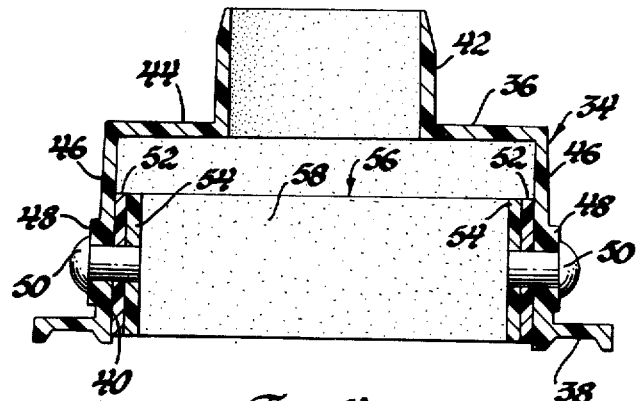
FIG. 4 is an enlarged sectional view taken generally along the plane indicated by line 4—4 of FIG. 2.

As shown in FIGS. 1 and 2, the flange 62 of the face plate is located below the column assembly 28 and partially surrounds the column assembly.

Under knee impact with either the side portions 18 or the center portion 20, the knee restraint 16 can move upwardly and forwardly of the vehicle about bracket 32. As this movement occurs, the center portion 20, rearwardly of bracket 32, moves upwardly and forwardly, and the flange 62 as well as the face plate and housing 36 engage the steering column assembly and then break to thereby block any interference with the collapse of the column assembly.

In the embodiment shown, the closure arrangement is formed of ABS material although it will be understood that any frangible material can likewise be used. It will also be understood that the face plate 38 can completely close the aperture 26 if it is desired to dispense with any connection between the closure arrangement and the vehicle ventilation system.

Thus, this invention provides an improved closure arrangement for an occupant knee restraint.

I claim:

1. In combination with an automotive vehicle including a collapsible energy absorbing steering column assembly engageable by the upper torso of a seated driver to absorb kinetic energy, a knee restraint including plastically deformable first portions located to each side of the column assembly and interconnected by a center portion partially surrounding the lower part of the column assembly and including an aperture opening thereto, closure means of non-plastically deformable frangible plastic material fitting in the aperture and extending adjacent to the lower part of the column assembly, means mounting the closure means on the center portion for movement therewith, deformation of the first portions by the driver's knees absorbing kinetic energy of the lower torso of the driver and applying compressive loads longitudinally of the femurs of the driver to control the kinematics of the upper torso of the driver with respect to the column assembly, the deformation of the first portions moving the center portion upwardly toward the column assembly to move the closure means into engagement with the lower part thereof, the frangible closure means breaking upon such engagement to permit collapse of the column assembly through the knee restraint without interference upon engagement of the upper torso of the driver with the column assembly.

2. In combination with an automotive vehicle including a collapsible energy absorbing steering column assembly engageable by the upper torso of a seated driver to absorb kinetic energy, a knee restraint including plastically deformable first portions located to each side of the column assembly and interconnected by a center portion partially surrounding the lower part of the column assembly and including an aperture having side walls to each side of the column assembly and a lower wall spaced from the lower part of the column assembly, the aperture opening upwardly to the column assembly, closure means of non-plastically deformable frangible plastic material fitting in the aperture and extending adjacent to the lower part of the column assembly, means mounting the closure means on the side walls of the center portion for movement therewith, deformation of the first portions by the driver's knees absorbing kinetic energy of the lower torso of the driver and applying compressive loads longitudinally of the femurs of the driver to control the kinematics of the upper torso of the driver with respect to the column assembly, the deformation of the first portions moving the center portion upwardly toward the column assembly to move the closure means into engagement with the lower part thereof, the frangible closure means breaking upon such engagement to permit collapse of the column assembly through the knee restraint without interference upon engagement of the upper torso of the driver with the column assembly.

3. In combination with an automotive vehicle including a collapsible energy absorbing steering column assembly engageable by the upper torso of a seated driver to absorb kinetic energy, a knee restraint including plastically deformable first portions located to each side of the column assembly and interconnected by a center portion partially surrounding the lower part of the column assembly and including an aperture opening thereto, a closure plate of non-plastically deformable frangible plastic material fitting in the aperture and extending adjacent to the lower part of the column assembly, means mounting the closure plate on the center portion for movement therewith, the closure plate including an opening therethrough for connection to a ventilation system of the vehicle and a movable louver within the opening of non-plastically deformable frangible plastic material, deformation of the first portions by the driver's knees absorbing kinetic energy of the lower torso of the driver and applying compressive loads longitudinally of the femurs of the driver to control the kinematics of the upper torso of the driver with respect to the column assembly, the deformation of the first portions moving the center portion upwardly toward the column assembly to move the closure plate into engagement with the lower part thereof, the frangible closure plate and louver breaking upon such engagement to permit collapse of the column assembly through the knee restraint without interference upon engagement of the upper torso of the driver with the column assembly.

* * * * *